April 26, 1960 C. S. YINGST ET AL 2,933,862
MAGNETIC DRIVING AND SUPPORTING APPARATUS
Filed Aug. 15, 1958 2 Sheets-Sheet 1

INVENTORS
Cyrus S. Yingst
BY Charles F. Carter Jr.
Norman S. Blodgett
Attorney

April 26, 1960 C. S. YINGST ET AL 2,933,862
MAGNETIC DRIVING AND SUPPORTING APPARATUS
Filed Aug. 15, 1958 2 Sheets-Sheet 2

INVENTORS
Cyrus S. Yingst
BY Charles F. Carter Jr.
Attorney

United States Patent Office 2,933,862
Patented Apr. 26, 1960

2,933,862

MAGNETIC DRIVING AND SUPPORTING APPARATUS

Cyrus S. Yingst, West Boylston, and Charles F. Carter, Jr., Holden, Mass., assignors to The Heald Machine Company, Worcester, Mass., a corporation of Delaware Application August 15, 1958, Serial No. 755,169

12 Claims. (Cl. 51—237)

This invention relates to a magnetic driving and supporting apparatus and, more particularly, to apparatus for use in a grinding machine for holding and rotating a workpiece.

In the internal grinding of workpieces it is common practice to make use of the so-called "centerless grinding" technique. In this grinding procedure the workpiece is rotatably supported on an external surface which is concentric with the internal bore which is to be ground. The workpiece is rotated about the center line of the bore by a drive plate which engages one radial end surface. To cause the workpiece to press against the drive plate it is common practice to use a clamping plate at the other end. This presents certain difficulties in introducing the grinding wheel into the bore, so it has been found useful to provide a magnetic drive plate which retains the workpiece in engagement by magnetic attraction, thus doing away with the clamping plate. Magnetic drive plates have generally been of a frusto-conical shape, the small end of the cone contacting the workpiece slightly eccentrically to produce a skewing force which presses the workpiece downwardly into the support shoes; the coil for producing the magnetic attraction has been embedded within the cone and a continuous magnetic path has been produced through the workpiece by making the drive plate in two concentric parts with an air gap between the two. This type of drive plate has been very intricate in form and has been expensive to manufacture. Because of the skewing action, it has been subjected to a considerable amount of wear; when it is considered that a different drive plate must be made for each workpiece use, the expense of replacement and the stock of drive plates it is necessary to maintain is not inconsiderable. These and other difficulties experienced with the prior art devices have been obviated in a novel manner by the present invention.

It is, therefore, an outstanding object of the invention to provide a magnetic drive plate in which the portion which contacts the workpiece is of simple construction and is inexpensively and easily replaced.

Another object of this invention is the provision of a magnetic drive plate in which the workpiece is not only attracted to the axial driving member but also to the radial supporting member.

It is a further object of the present invention to provide apparatus for use in a grinding machine in which the driving member is concentric with the workpiece.

A still further object of the instant invention is the provision of magnetic driving and supporting apparatus in which magnetic force is used to produce the friction between the driving member and the workpiece, and it is also used to maintain the workpiece in place on the supporting member.

A further object of the invention is the provision of a magnetic driving and supporting apparatus for use in the internal grinding of an annular workpiece in which the workpiece is held on the radial supporting member by magnetic forces and is held in contact with the axial driving member in a similar manner.

A still further object of the invention is the provision of magnetic driving and supporting apparatus in which no commutation is necessary to provide the magnetic-field-producing current.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawings in which.

Figure 1:
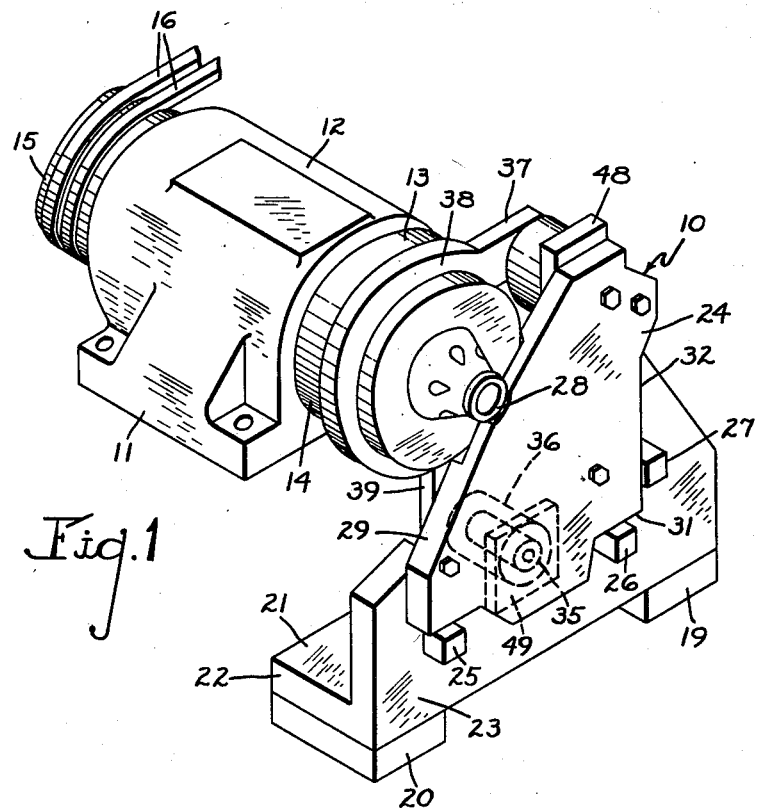
Fig. 1 is a perspective view of apparatus embodying the principles of the present invention.
Figure 2:
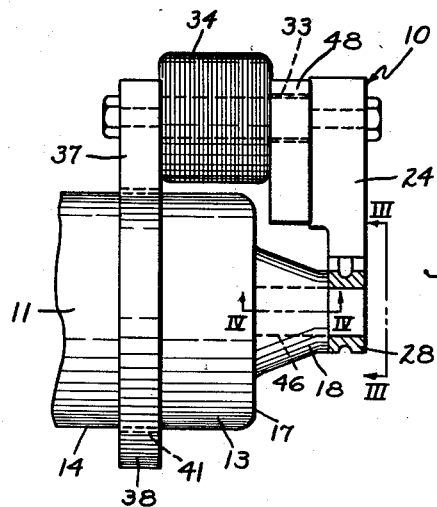
Fig. 2 is a plan view of the apparatus.

Referring first to Fig. 1, wherein are best shown the general features of the invention, the magnetic driving and supporting apparatus, indicated generally by the reference numeral 10, is shown in use in conjunction with the workhead 11 of an internal grinding machine (not shown) of the usual type. The workhead consists of a body 12 in which is rotatably mounted a drive shaft 13. At one end the shaft is provided with a cylindrical outer surface 14, and at the other end is provided a pulley 15 driven by belts 16 in the usual manner by an electric motor (not shown) mounted on the bed of the internal grinding machine. The end of the drive shaft 13, which is provided with the cylindrical outer surface 14, terminates in a radial plane surface 17 on which is mounted a nose piece 18. Mounted on the bed of the internal grinding machine and separated therefrom by non-magnetic spacers 20 and 19 is a base 21 having a horizontal portion 22 which is bolted to the grinding machine and a vertical portion 23. Bolted to the vertical portion 23 is a workholder 24, the surface of the base having locating blocks 25, 26, 27 extending therefrom to locate the workholder accurately. A workpiece 28 is shown supported by the workholder 24 and contacted by the nosepiece 18. The workholder 24 is roughly in the shape of a right triangle with a diagonal side 29 supporting the workpiece and the other sides 31 and 32 extending horizontally and vertically, respectively. In a position adjacent the intersection of the sides 29 and 32 is mounted a magnetic core 33 carrying a coil 34 suitably connected to a source of electrical current (not shown). At a position approximately mid-way of the side 31 of the workholder 24 is located a magnetic core 35 on which is mounted a coil 36 also suitably connected to a source of electrical current. The cores 33 and 35 are of generally cylindrical conformation with their axes extending parallel to the axis of the workpiece and of the drive shaft 13. The other end of the core 33 is bolted to an arm 37 extending horizontally from an annular collector ring 38 surrounding the cylindrical outer surface 14 of the drive shaft 13. The other end of the core 35 is connected to an arm 39 which extends vertically downwardly from the annular ring 38. The ring 38, therefore, is rigidly mounted by its connection through the cores 33 and 35 to the workholder 24, the base 21, and the bed of the grinding machine. The collector ring 38 is provided with an internal cylindrical bore 41 which is slightly larger than the cylindrical outer surface 14 of the drive shaft 13, thus defining therebetween a small annular air gap.

Figure 3:
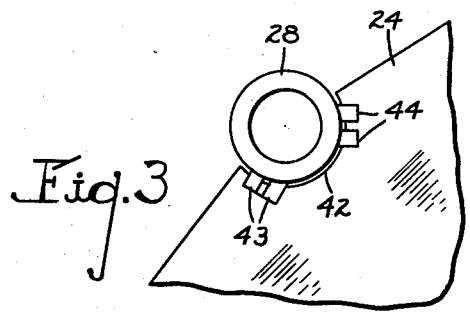
Fig. 3 is a somewhat enlarged view of a portion of the apparatus taken on the line III—III of Fig. 2.

Referring now to Fig. 3, it can be seen that the workholder 24 is provided with a semi-circular recess 42 which embraces the external surface of the workpiece 28 that carbide shoes 43 and 44 are mounted in the workholder 24 so as to project slightly into the recess so that a small air gap exists between the edge of the semi-circular recess 42 and the surface of the workpiece 28. The carbide shoes 43 and 44 are formed with cylindrical surfaces to fit the outer periphery of the workpiece 28.

Figure 4:
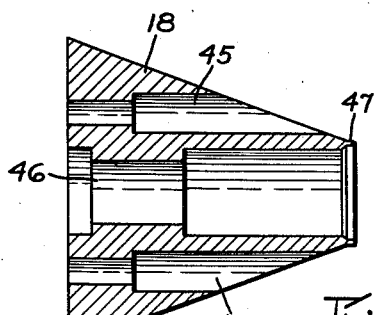
Fig. 4 is a sectional view of a portion of the apparatus taken on the line IV—IV of Fig. 2.

Referring now to Fig. 4, which shows the details of the nosepiece 18, it can be seen that the nosepiece is of a generally frusto-conical form and is provided with axial bores 45 to receive bolts for mounting the nosepiece on the surface 17 of the drive shaft 13. An axial bore 46 extends through the nosepiece to permit the entrance of the internal grinding wheel and also to provide for gauging apparatus of the well-known type. Extending axially from the small end of the nosepiece is a lip 47 of generally tubular form having cylindrical inner and outer surfaces which are concentric with one another and which are only slightly spaced.

The operation of the apparatus will now be readily understood in view of the above description. The internal grinding machine is operated in the usual way with the grinding wheel entering the bore in the workpiece 28 and reciprocating therein to finish the internal surface. The grinding wheel is moved laterally to move it into contact with the surface to be finished and to remove material until the grinding cycle is terminated. The belts 16 serve to rotate the drive shaft 13 and thus rotate the nosepiece 18. The outer periphery of the workpiece 28 rests against the carbide shoes 43 and 44 of the workholder 24. When the coils 34 and 36 are energized by electrical current, a magnetic field is produced. The field originates in the cores 33 and 35 and is carried through the workholder 24 to the workpiece 28, thus holding the workpiece 28 in same contact with the shoes 43 and 44; the carbide material of which the shoes are formed is non-magnetic, but the workholder 24 is of magnetic material and therefore a slight air gap exists between the recess 42 of the workholder and the outer periphery of the workpiece 28. The air gap exists to prevent rubbing and erosion and thus provide more uniform holding force over a long period of operation. In the other direction the magnetic field originating in the coils 34 and 36 and the cores 33 and 35 passes through the arms 37 and 39 into the collector ring 38. From the collector ring the magnetic field passes across the air gap which exists between the internal bore 41 of the collector ring and the cylindrical outer surface 14 of the drive shaft 13. The magnetic field carries through the outboard end of the drive shaft 13 into the nosepiece 18 and, because of the contact of the lip 47 with the end of the workpiece 28, the workpiece is held securely against the lip of the nosepiece. It should be noted, then, that small air gaps exist both between the collector ring 38 and the drive shaft 13 and between the workholder 24 and the workpiece 28.

The advantages of the above construction and operation are readily evident from the description. With this type of construction the nosepiece 18 is very simply constructed; it is made of one piece of metal and involves only one machining operation to form it. It is an inexpensive matter, therefore, to have one nosepiece for each size of workpiece which might be finished in the grinding machine. The fact that the workpiece is held securely in the workholder by means of magnetic forces means that the nosepiece 18 can be mounted exactly concentrically with the workpiece. That is to say, there is no need for mounting the two eccentrically to produce the usual skewing or scouring action to force the workpiece into the shoes. This scouring action was the source of considerable wear on the nosepiece and required frequent replacement thereof. Furthermore, this action was detrimental to the end surface of the workpiece. Furthermore, with the present apparatus it is possible to adjust the relationship between a force holding the workpiece in the workholder and the force holding it against the nosepiece 18 for driving; this can be done by adjusting the size of the elements or by moving the coil 34 along the core 33 and in moving the coil 36 along the core 35 in the same manner. Spacer plates 48 and 49 are provided for this purpose. With the coils in fixed position relative to the base of the grinding machine there is no necessity for providing commutation apparatus to the coils as was formerly necessary in magnetic drive plates in which the coil was incorporated in the nosepiece.

It is obvious that minor changes may be made in the form and construction of the invention without departing from the material spirit thereof. It is not, however, desired to confine the invention to the exact form herein shown and described, but it is desired to include all such design as come properly within the scope of this invention and herein claimed.

The invention having thus been described, what is desired to secure by Letters Patent and is claimed as new is:

1. Apparatus for driving and supporting an annular workpiece, comprising a drive shaft having a frusto-conical nosepiece for engaging an end of the workpiece, a workholder having shoes engaging the outer periphery of the workpiece, a collector ring closely surrounding the drive shaft, and a magnetic coil joining the workholder and the collector ring.

2. Apparatus for driving and supporting an annular workpiece, comprising drive means including a nosepiece for engaging an end of the workpiece, a workholder including means for engaging the outer periphery of the workpiece, a collector means lying closely adjacent to a substantial portion of the drive means, and a magnetic coil joining the workholder and the collector means.

3. Apparatus for driving and supporting an annular workpiece, comprising a drive shaft including a nosepiece adapted to engage an end of the workpiece in driving relation, a workholder including carbide shoes adapted to engage the outer periphery of the workpiece in supporting relation, a collector ring closely surrounding the drive-shaft, and a magnetic coil joining the workholder and the ring.

4. Apparatus for driving and supporting an annular workpiece, comprising a drive shaft including a nosepiece adapted to engage an end of the workpiece in driving relation, a workholder including means adapted to engage the outer periphery of the workpiece in supporting relation, a collector ring closely surrounding the drive shaft and having outwardly extending arms extending at an angle of approximately 90°, and a magnetic coil joining each of the arms to the workholder.

5. Apparatus for driving and supporting an annular workpiece, comprising a drive shaft including a frusto-conical nosepiece adapted at its smaller end to engage an end of the workpiece in driving relation, there being a narrow annular lip at the said smaller end for engagement with the workpiece, a workholder including means adapted to engage the outer periphery of the workpiece in supporting relation, a collector ring closely surrounding the drive shaft, and a magnetic coil joining the workholder and the ring.

6. Apparatus for driving and supporting an annular workpiece, comprising a drive shaft including a nosepiece adapted to engage an end of the workpiece in driving relation, a workholder including carbide shoes adapted to engage the outer periphery of the workpiece in supporting relation, a collector ring closely surrounding the drive shaft, the said ring having outwardly extending arms extending at an angle of approximately 90° to one another, and a magnetic coil joining each of the said arms to the workholder.

7. Apparatus for driving and supporting an annular workpiece, comprising a drive shaft including a frusto-conical nosepiece having at its smaller end an annular lip adapted to engage an end of the workpiece in driving relation, a workholder including means adapted to engage the outer periphery of the workpiece in supporting relation, a collector ring closely surrounding the drive shaft, the ring having arms extending outwardly at an angle of substantially 90° to one another, and a magnetic coil joining each of the said arms to the workholder.

8. Apparatus for driving and supporting an annular workpiece, comprising a drive shaft including a frusto-conical nosepiece having at its smaller end an annular lip adapted to engage an end of the workpiece in driving relation, a workholder including carbide shoes adapted to engage the outer periphery of the workpiece in supporting relation, a collector ring closely surrounding the drive shaft, and a magnetic coil joining the workholder and the ring.

9. Apparatus for driving and supporting an annular workpiece, comprising a drive shaft including a frusto-conical nosepiece having at its smaller end thin annular lip adapted to engage an end of the workpiece in driving relation, a workholder including carbide shoes adapted to engage the outer periphery of the workpiece in supporting relation, a collector ring closely surrounding the drive shaft and having two arms extending outwardly therefrom at approximately a right angle to one another, and a magnetic coil joining each of the said arms to the ring.

10. Apparatus for driving and supporting an annular workpiece in a grinding machine, comprising a drive shaft including a frusto-conical nosepiece having its smaller end free and provided with a thin annular lip adapted to engage an end of the workpiece in driving relation, a workholder including carbide shoes adapted to engage the outer periphery of the workpiece in supporting relation, a collector ring closely surrounding the drive shaft and having two arms extending outwardly therefrom at approximately a right angle to one another, and a magnetic coil joining each of the said arms to the ring, thus providing a closed magnetic loop from the workpiece, through the nosepiece and the drive shaft, through the ring and its arms, and through the coils and workholder to the workpiece.

11. Apparatus for driving and supporting an annular workpiece in a grinding machine, comprising a drive shaft having a cylindrical outer surface, a frusto-conical nosepiece fastened to an outer end of the shaft, the nosepiece having its outer end free and provided with a thin annular lip adapted to engage an end of the workpiece in driving relation, a workholder including shoes formed of very hard material adapted to engage the outer periphery of the workpiece in supporting relation, a collector ring closely surrounding the cylindrical surface of the drive shaft and having two arms extending outwardly therefrom, one arm extending vertically downwardly and the other arm extending horizontally, and a magnetic coil having a core joining each of the said arms to the ring, the cores constituting substantially the entire support for the ring, thus providing a closed magnetic loop from the workpiece, through the nosepiece and the drive shaft, through the ring and its arms, and through the coils and the workholder through the workpiece.

12. Apparatus for driving and supporting an annular workpiece, comprising drive means including a nosepiece for engaging an end of the workpiece, a workholder including means for engaging the outer periphery of the workpiece, a collector means lying closely adjacent to a substantial portion of the drive means, and a magnetic coil associated with the workholder and the collector means.

References Cited in the file of this patent

UNITED STATES PATENTS

| | | |
|---|---|---|
| 2,381,458 | Meister | Aug. 7, 1945 |
| 2,478,607 | Theler et al. | Aug. 9, 1949 |
| 2,694,883 | Balsiger | Nov. 23, 1954 |
| 2,787,874 | Blood et al. | Apr. 9, 1957 |